(12) United States Patent
Kim et al.

(10) Patent No.: US 11,747,540 B2
(45) Date of Patent: Sep. 5, 2023

(54) DISPLAY DEVICE INCLUDING FLAT LIGHTING DEVICE

(71) Applicant: LG ELECTRONICS INC., Seoul (KR)

(72) Inventors: Geunhwan Kim, Seoul (KR); Juyoung Joung, Seoul (KR); Jungnam An, Seoul (KR); Minho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/776,216

(22) PCT Filed: Nov. 12, 2019

(86) PCT No.: PCT/KR2019/015326
§ 371 (c)(1),
(2) Date: May 11, 2022

(87) PCT Pub. No.: WO2021/095902
PCT Pub. Date: May 20, 2021

(65) Prior Publication Data
US 2022/0397717 A1    Dec. 15, 2022

(51) Int. Cl.
*F21V 8/00* (2006.01)

(52) U.S. Cl.
CPC ......... *G02B 6/0026* (2013.01); *G02B 6/0031* (2013.01); *G02B 6/0066* (2013.01)

(58) Field of Classification Search
CPC .. G02B 6/0026; G02B 6/0031; G02B 6/0066; G02B 6/005; G02B 6/00;
(Continued)

(56) References Cited

U.S. PATENT DOCUMENTS 8,169,135 B2 *   5/2012   Zhai ..................... F21K 9/64
                                                      313/112
2005/0184638 A1 *   8/2005   Mueller ........... C09K 11/77342
                                                      313/485
(Continued)

FOREIGN PATENT DOCUMENTS

KR    1020140094806    7/2014
KR    1020170126008    11/2017

OTHER PUBLICATIONS

PCT International Application No. PCT/KR2019/015326, International Search Report dated Aug. 6, 2020, 9 pages.

*Primary Examiner* — Donald L Raleigh
(74) *Attorney, Agent, or Firm* — LEE, HONG, DEGERMAN, KANG & WAIMEY PC

(57) ABSTRACT

The present invention can be applied to the technical field pertaining to display devices and, for example, relates to a flat lighting device using a light emitting diode (LED) and a display device including same. The present invention provides a display device including a flat lighting device, wherein the display device may comprise: a light source which emits white light by using a light emitting diode and a yellow phosphor; a red phosphor layer which is disposed on the light source and adsorbs a part of the white light emitted from the light source to emit red light; and a first dichroic filter layer which is disposed on the red phosphor layer and has a reflective pattern reflecting at least a part of the long-wavelength side of the wavelength region of the red light.

15 Claims, 15 Drawing Sheets

(58) Field of Classification Search
CPC ......... G02F 1/133605; G02F 2202/043; G02F 1/133614; G02F 1/1336; G02F 1/133509
See application file for complete search history.

(56) References Cited

U.S. PATENT DOCUMENTS

2010/0283914 A1    11/2010  Hamada
2017/0269279 A1*  9/2017  Wyatt ..................... H01L 33/46
2017/0293066 A1*  10/2017  Van Bommel ....... G02B 6/0026

\* cited by examiner

DISPLAY DEVICE INCLUDING FLAT LIGHTING DEVICE

CROSS-REFERENCE TO RELATED APPLICATIONS

This application is the National Stage filing under 35 U.S.C. 371 of International Application No. PCT/KR2019/015326, filed on Nov. 12, 2019, the contents of which are all incorporated by reference herein in their entirety.

TECHNICAL FIELD

The present disclosure is applicable to technical fields related to display devices, and relates, for example, to a display device including a planar lighting device using a light-emitting diode (LED).

BACKGROUND ART

Among displays, liquid crystal displays (LCDs) are used in a wide range of applications including televisions, laptop computers, desktop computer monitors, and mobile phones.

Since an LCD is not self-emissive, a light-emitting device for illuminating a liquid crystal panel is needed to display image information.

The light-emitting device of the LCD is coupled to the rear surface of the liquid crystal panel, and is thus referred to as a backlight unit. The backlight unit is a device that forms a uniform surface light source and supplies light to the liquid crystal panel.

A light-emitting diode (LED) has a structure in which an n-type semiconductor layer, an emission layer, and a p-type semiconductor layer are stacked on a substrate and electrodes are formed on the p-type semiconductor layer and the n-type semiconductor layer. Regarding the principle of generation of light by the light-emitting diode, light is generated in the emission layer by recombination of holes and electrons, which are injected from respective semiconductor layers, and is emitted outside.

Light-emitting diodes may constitute a light-emitting diode package, which is used as a light source of a backlight unit (BLU).

Such a backlight unit provides a planar light source to the liquid crystal panel, and is thus considered to be an example of a planar lighting device. The planar lighting device is considered to be a light source that is capable of radiating light uniformly through the flat surface thereof and has a relatively small thickness.

Use of the planar lighting device may lead to a display device having improved luminous efficiency and a slim structure.

In recent years, one of the important attractive features for display devices, such as TVs, is color reproducibility. A quantum dot sheet may be applied in order to improve color reproducibility. A quantum dot material in a quantum dot sheet converts light emitted from a blue LED into high-purity green light and red light having a narrow full width at half maximum, thereby improving color reproducibility.

In the case in which a quantum dot sheet is applied to a direct-type planar lighting device, in which light emitted from an LED directly passes through optical sheets, a lens mura phenomenon may occur. As one of solutions thereto, a quantum dot sheet may be used. However, use of the quantum dot sheet may increase manufacturing costs.

Therefore, there is a need for a solution for overcoming the above problems.

DISCLOSURE

Technical Task

A technical task of the present disclosure is to provide a display device including a planar lighting device capable of exhibiting high color reproducibility.

Particularly, a technical task of the present disclosure is to provide a display device including a planar lighting device capable of exhibiting high color reproducibility without using a quantum dot sheet.

Technical Solutions

In accordance with a first aspect for accomplishing the above objects, a display device including a planar lighting device of the present disclosure may include a light source configured to emit white light using a light-emitting element and a yellow phosphor, a red phosphor layer located on the light source and configured to absorb a portion of the white light emitted from the light source and to emit red light, and a first dichroic filter layer located on the red phosphor layer and having a reflection pattern reflecting at least a part of the long-wavelength portion in the wavelength band of the red light.

In addition, the display device may include a second dichroic filter layer, which is located between the light source and the red phosphor layer and has a reflection pattern reflecting at least a part of the long-wavelength portion in the wavelength band of the yellow light emitted from the yellow phosphor.

In addition, the light source may include a light guide plate, the light-emitting element may be located beside the light guide plate, and the second dichroic filter layer may be located between the light-emitting element and the light guide plate.

In addition, the light source may include a reflective layer, and the light-emitting element may be disposed on the reflective layer, and may emit light toward the second dichroic filter layer.

In addition, the first dichroic filter layer may reduce the full width at half maximum of the red light.

In addition, the second dichroic filter layer may reduce the full width at half maximum of the yellow light.

In addition, the second dichroic filter layer may convert the yellow light into green light.

In addition, the first dichroic filter layer may form a peak corresponding to the red light, and the second dichroic filter layer may form a peak corresponding to the green light.

In accordance with a second aspect for accomplishing the above objects, a display device including a planar lighting device of the present disclosure may include a light source configured to emit white light using a light-emitting element and a yellow phosphor, a red phosphor layer located on the light source and configured to absorb a portion of the white light emitted from the light source and to emit red light, and a first dichroic filter layer located on the red phosphor layer and including a transmission band and a reflection band, which includes at least a part of the long-wavelength portion in the wavelength band of the red light.

In addition, the transmission band may be connected to the reflection band at the short-wavelength portion of the red light.

In addition, the transmission band and the reflection band may form a boundary therebetween, and the boundary may be located within the peak of the red light.

In addition, the display device may include a second dichroic filter layer, which is located between the light source and the red phosphor layer and has a reflection pattern reflecting at least a part of the long-wavelength portion in the wavelength band of the yellow light emitted from the yellow phosphor.

Advantageous Effects

According to an embodiment of the present disclosure, there are the following effects.

First, it is possible to reduce the full width at half maximum of the peaks of blue light B, green light G, and red light R without using a quantum dot sheet, thereby emitting high-purity blue light B, green light G, and red light R.

In this way, the blue light B, the green light G, and the red light R having a reduced full width at half maximum may pass through a color filter in a liquid crystal panel, whereby a pixel emitting high-purity blue light B, green light G, and red light R may be realized. Accordingly, the color reproducibility of a liquid crystal display device may be improved.

Furthermore, according to another embodiment of the present disclosure, there are additional effects not mentioned herein. Those of ordinary skill in the art may understand it through the full text of the specification and drawings.

BEST MODE FOR DISCLOSURE

Figure 1:
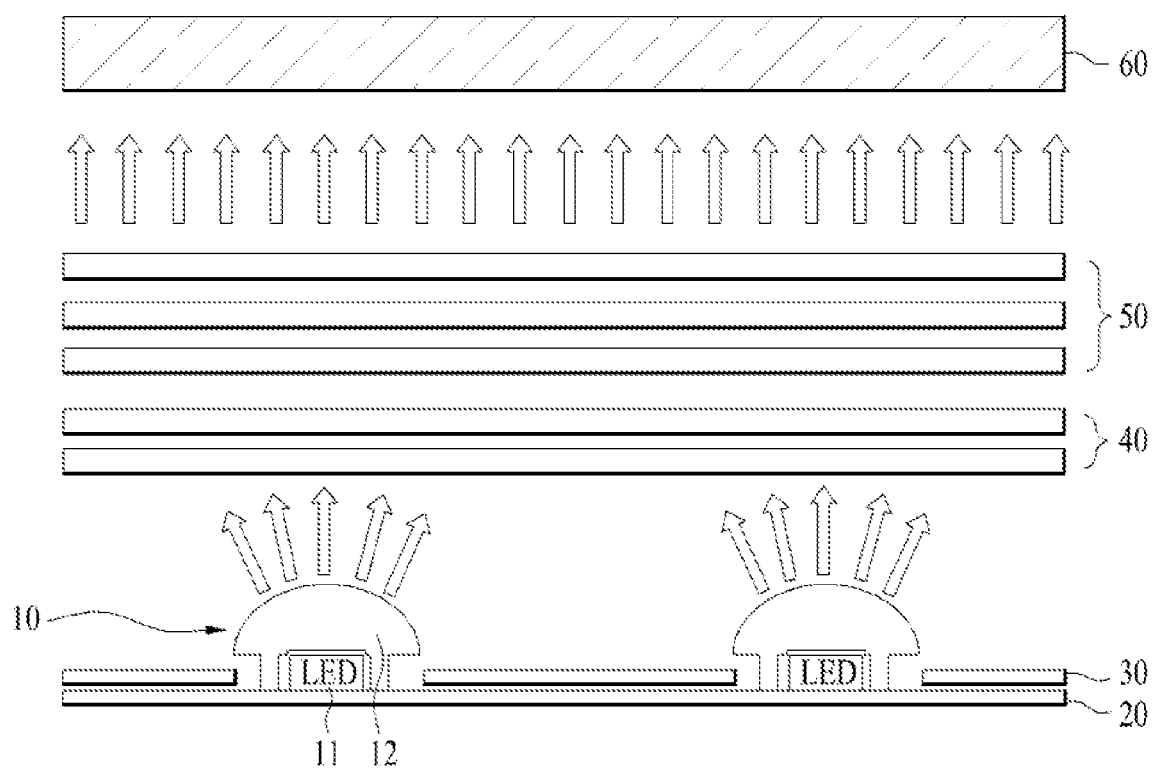
FIG. 1 is a schematic cross-sectional diagram showing an example of a display device including a planar lighting device.

Reference will now be made in detail to embodiments of the present disclosure, examples of which are illustrated in the accompanying drawings. Wherever possible, the same reference numbers will be used throughout the drawings to refer to the same or like parts, and a redundant description thereof will be omitted. As used herein, the suffixes "module" and "unit" are added or used interchangeably to facilitate preparation of this specification, and are not intended to suggest distinct meanings or functions. In describing embodiments disclosed in this specification, relevant well-known technologies may not be described in detail in order to avoid obscuring the subject matter of the embodiments disclosed in this specification. In addition, it should be noted that the accompanying drawings are only for easy understanding of the embodiments disclosed in the present specification, and should not be construed as limiting the technical spirit disclosed in the present specification. Reference will now be made in detail to embodiments of the present disclosure, examples of which are illustrated in the accompanying drawings. Wherever possible, the same reference numbers will be used throughout the drawings to refer to the same or like parts, and a redundant description thereof will be omitted. As used herein, the suffixes "module" and "unit" are added or used interchangeably to facilitate preparation of this specification, and are not intended to suggest distinct meanings or functions. In describing embodiments disclosed in this specification, relevant well-known technologies may not be described in detail in order to avoid obscuring the subject matter of the embodiments disclosed in this specification. In addition, it should be noted that the accompanying drawings are only for easy understanding of the embodiments disclosed in the present specification, and should not be construed as limiting the technical spirit disclosed in the present specification.

Furthermore, although the drawings are separately described for simplicity, embodiments implemented by combining two or more drawings are also within the scope of the present disclosure.

In addition, when an element such as a layer, a region, or a substrate is described as being "on" another element, it is to be understood that the element may be directly on the other element, or there may be an intermediate element between them.

The display device described herein conceptually includes all display devices that display information with a unit pixel or a set of unit pixels. Therefore, the term "display device" may be applied not only to finished products but also to parts. For example, a panel corresponding to a part of a digital TV also independently corresponds to the display device in the present specification. Such finished products include a mobile phone, a smartphone, a laptop computer, a digital broadcasting terminal, a personal digital assistant (PDA), a portable multimedia player (PMP), a navigation system, a slate PC, a tablet PC, an Ultrabook, a digital TV, a desktop computer, and the like.

However, it will be readily apparent to those skilled in the art that the configuration according to the embodiments described herein is also applicable to new products to be developed later as display devices.

In addition, the term "semiconductor light-emitting element" mentioned in this specification conceptually includes an LED, a micro LED, and the like, and may be used interchangeably therewith.

FIG. 1 is a schematic cross-sectional diagram showing an example of a display device including a planar lighting device.

Referring to FIG. 1, a planar lighting device may be located on a lower cover 20, and a liquid crystal panel 60 may be located on the planar lighting device 20. The planar lighting device 20 and the liquid crystal panel 60 may constitute a liquid crystal display device.

The planar lighting device includes a plurality of light sources 10 located on the lower cover 20. Each of the light sources 10 may be implemented as a light-emitting element 11, such as a light-emitting diode (LED). The light-emitting element 11 may emit white light. For example, the light-emitting element 11 may be an element in which a yellow phosphor is located on a blue light-emitting diode. Blue light and yellow light may be mixed with each other to realize white light.

In addition, a lens 12 may be provided on the light-emitting element 11. The lens 12 enables the light emitted from the light-emitting element 11 to be radiated upwards in a substantially parallel pattern.

In this case, a reflective layer 30 may be located between the light-emitting elements 11. The reflective layer 30 may include a reflective sheet.

A diffusion plate 40 may be located on the light source 10. In this case, the diffusion plate 40 may be composed of multiple layers. In one example, a diffusion plate may be located at a lower position, and a high-color sheet may be located on the diffusion plate.

A plurality of optical sheets 50 may be located on the diffusion plate 40. The optical sheets 50 may have optical properties such as reflectivity or transmissivity.

The optical sheets 50 may be formed of a material manufactured by mixing Phenyl Propanol Amine (PPA), Epoxy Molding Compound (EMC), Micro Cell PolyEthylene Terephthalate (MCPET), silver (Ag), aluminum (Al) having excellent reflectance, and beads having reflective, transmissive, or refractive properties, made of, for example, Ti, Al, Ag, or $SiO_2$, with a resin.

The light sources 22 may be arranged at regular intervals on the lower cover 16. The light sources 22 may be arranged in the same line, or may be arranged in a zigzag form.

The white light emitted from the planar lighting device (10, 30, 40, and 50) may be incident on the liquid crystal panel 60 to implement a display. That is, the planar lighting device and the liquid crystal panel 60 may implement a liquid crystal display device. In addition, such a liquid crystal display device may be used in various devices implementing a screen, such as TVs or monitors.

Figure 2:
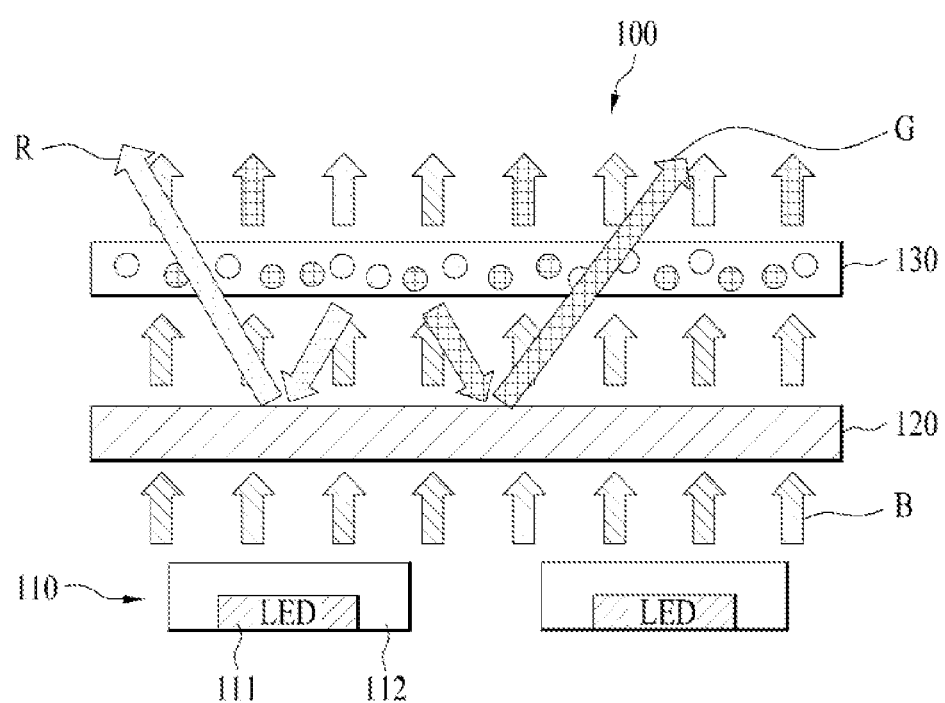
FIG. 2 is a schematic cross-sectional diagram showing another example of a planar lighting device.
Figure 3:
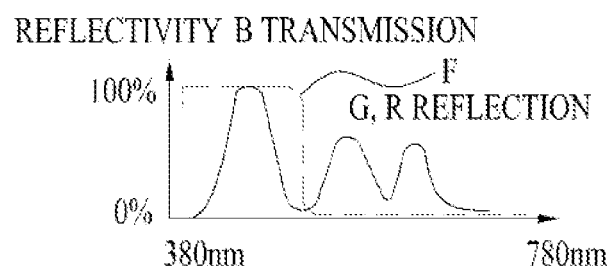
FIG. 3 is a graph showing the reflection pattern of the dichroic filter layer of FIG. 2.

FIG. 2 is a schematic cross-sectional diagram showing another example of a planar lighting device. In addition, FIG. 3 is a graph showing the reflection pattern of the dichroic filter layer of FIG. 2.

FIG. 2 shows a planar lighting device using a dichroic filter layer 120 and a quantum dot sheet 130.

In this case, the dichroic filter layer 120 is a filter layer that selectively transmits or reflects light. In one example, as shown in FIG. 3, the dichroic filter layer may have a reflection pattern F that reflects green light and red light and transmits blue light.

Accordingly, the blue light emitted from the light source 110 may pass through the dichroic filter layer 120, and may be converted into red light and green light while passing through the quantum dot sheet 130 after passing through the dichroic filter layer 120.

Accordingly, the red light, the green light, and the blue light that have passed through the quantum dot sheet 130 are mixed with each other to form white light. In this case, the red light and the green light emitted downwards from the quantum dot sheet 130 may be reflected upwards from the dichroic filter layer 120.

In recent years, one of the important attractive features for TVs is color reproducibility. As described above, a quantum dot sheet may be applied in order to improve color reproducibility. A quantum dot material in a quantum dot sheet converts light emitted from a blue LED into high-purity green light and red light having a narrow full width at half maximum, thereby improving color reproducibility.

In the case in which a quantum dot sheet is applied to a direct-type planar lighting device, in which light emitted from an LED directly passes through optical sheets, a lens mura phenomenon may occur. As one of solutions thereto, a quantum dot sheet may be used. However, use of the quantum dot sheet may increase manufacturing costs.

Therefore, the present disclosure provides a display device including a planar lighting device capable of exhibiting high color reproducibility.

Particularly, a display device including a planar lighting device capable of exhibiting high color reproducibility without using a quantum dot sheet is provided.

Figure 4:
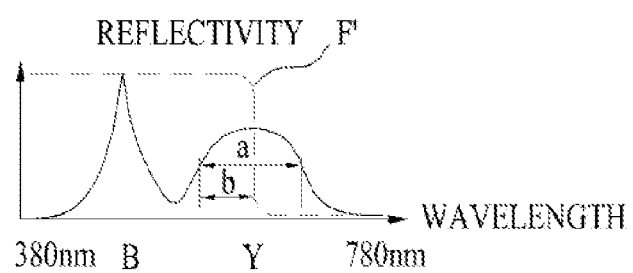
FIG. 4 is a graph showing the reflection pattern of a dichroic filter layer that reduces the full width at half maximum of light, which is the gist of the present disclosure.

FIG. 4 is a graph showing the reflection pattern of a dichroic filter layer that reduces the full width at half maximum of light, which is the gist of the present disclosure.

As described above, the dichroic filter layer is a filter layer that selectively transmits or reflects light.

Referring to FIG. 4, in one example, the dichroic filter layer may have a reflection pattern F' that reflects at least a part of the long-wavelength portion of yellow light Y.

In this case, when blue light B and yellow light Y converted by a yellow phosphor are mixed with each other to form white light, the dichroic filter layer may transmit the short-wavelength portion of the yellow light Y, and may reflect at least a part of the long-wavelength portion of the yellow light Y.

Then, the long-wavelength portion of the yellow light Y may be reflected, and only the green light may be substantially transmitted. Accordingly, high-purity blue light and green light may be emitted.

As a result, the dichroic filter layer may have an effect of reducing the full width at half maximum (FWHM) of the yellow light Y. That is, the initial yellow light may have a wide full width at half maximum a. However, the yellow light may be imparted with a halved full width at half maximum b by passing through the dichroic filter layer.

Accordingly, it is possible to realize high color reproducibility without using a quantum dot sheet. The present disclosure provides a display device including a planar lighting device exhibiting high color reproducibility using the reflection pattern of the dichroic filter layer.

Figure 5:
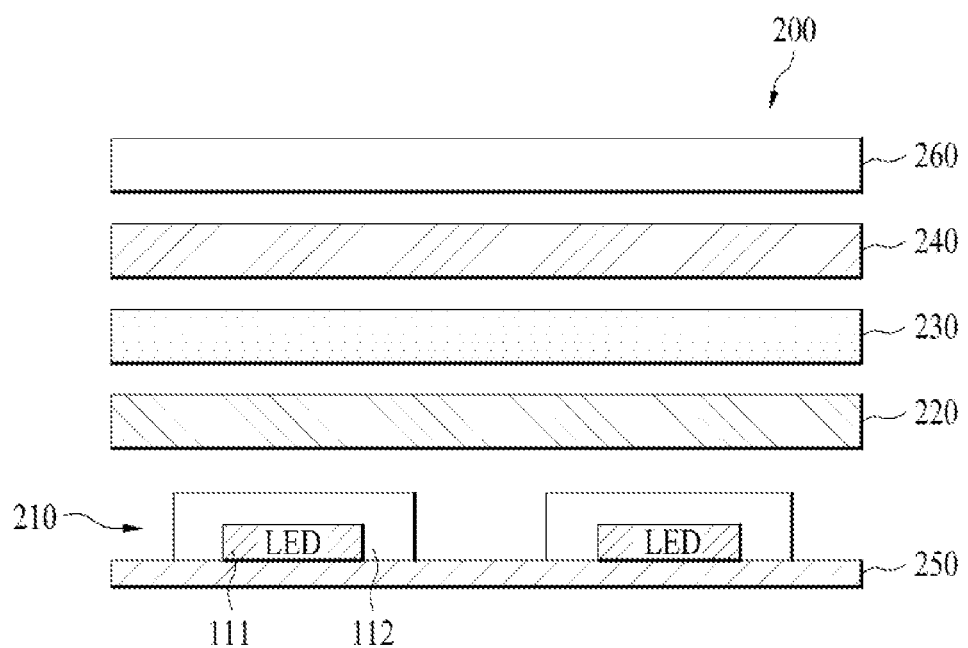
FIG. 5 is a schematic cross-sectional diagram showing a display device including a planar lighting device according to a first embodiment of the present disclosure.

FIG. 5 is a schematic cross-sectional diagram showing a display device including a planar lighting device according to a first embodiment of the present disclosure.

Referring to FIG. 5, a planar lighting device 200 includes a plurality of light sources 210 located on a reflective layer

250. Each of the light sources 210 may be implemented as a light-emitting element, such as a light-emitting diode (LED). The light-emitting element may emit white light. For example, the light-emitting element may be an element in which a yellow phosphor 112 is located on a blue light-emitting diode 111. The blue light emitted from the blue light-emitting diode 111 and the yellow light, resulting from conversion of at least a portion of the blue light by the yellow phosphor 112, may be mixed with each other to realize white light.

As described above with reference to FIG. 1, the planar lighting device 200 may be located on the lower cover 20 (refer to FIG. 2), and the liquid crystal panel 60 (FIG. 1) may be located on the planar lighting device 200. The planar lighting device 200 and the liquid crystal panel 60 may constitute a liquid crystal display device. An embodiment in which the liquid crystal panel 60 is omitted will be described below. However, the planar lighting device 200 of the present disclosure may implement a liquid crystal display device together with the liquid crystal panel 60. In addition, with regard to parts not described in the following embodiment, reference may be made to the description of the parts described above with reference to FIGS. 1 to 3.

A red phosphor layer 230, which absorbs a portion of the white light emitted from the light sources 210 and emits red light, may be located on the light sources 210.

In addition, a first dichroic filter layer 240, which has a reflection pattern that reflects at least a part of the long-wavelength portion in the wavelength band of the red light emitted from the red phosphor layer 230, may be located on the red phosphor layer 230.

An optical sheet 260 may be located on the first dichroic filter layer 240. As described above, the optical sheet 260 may be formed of a material manufactured by mixing Phenyl Propanol Amine (PPA), Epoxy Molding Compound (EMC), Micro Cell PolyEthylene Terephthalate (MCPET), silver (Ag), aluminum (Al) having excellent reflectance, and beads having reflective, transmissive, or refractive properties, made of, for example, Ti, Al, Ag, or $SiO_2$, with a resin.

Meanwhile, a second dichroic filter layer 220, which has a reflection pattern that reflects at least a part of the long-wavelength portion in the wavelength band of the yellow light emitted from the yellow phosphor 112, may be located between the light sources 210 and the red phosphor layer 230.

However, in some embodiment, the second dichroic filter layer 220 may be omitted (for example, the embodiment described with reference to FIG. 14).

Figure 6:
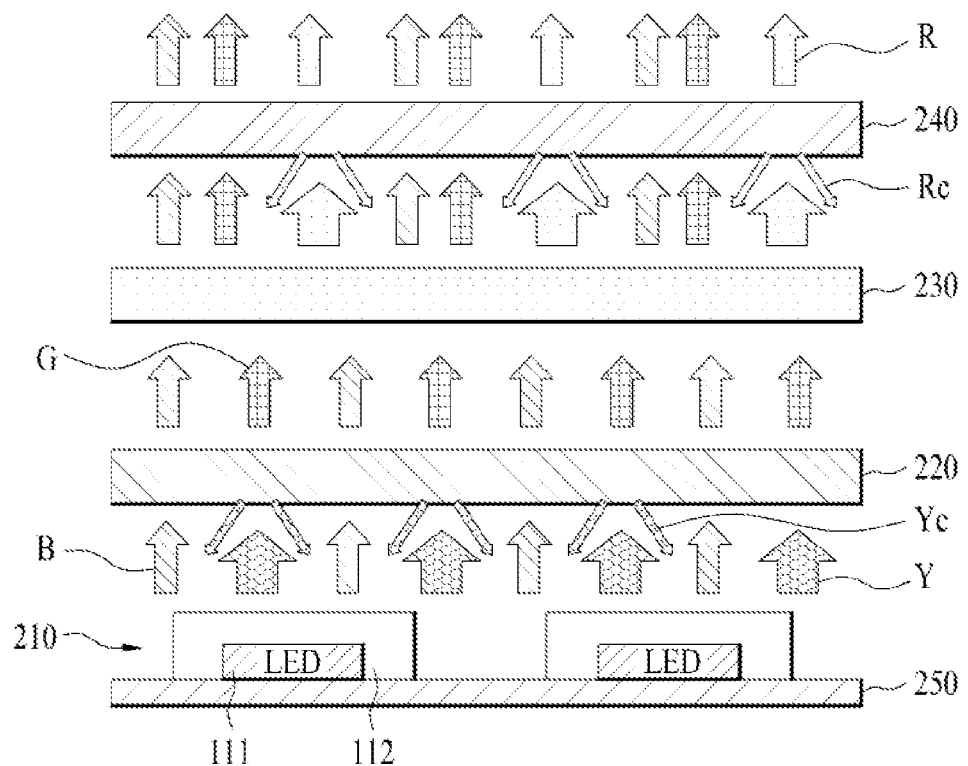
FIG. 6 is a diagram for explaining an example of realizing high color reproducibility using the display device including the planar lighting device according to the first embodiment of the present disclosure.

FIG. 6 is a diagram for explaining an example of realizing high color reproducibility using the display device including the planar lighting device according to the first embodiment of the present disclosure.

Figure 7:
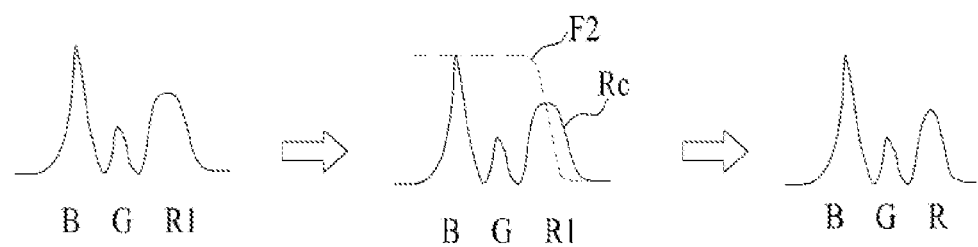
FIG. 7 is a schematic diagram showing the reflection pattern of a second dichroic filter layer.
Figure 8:
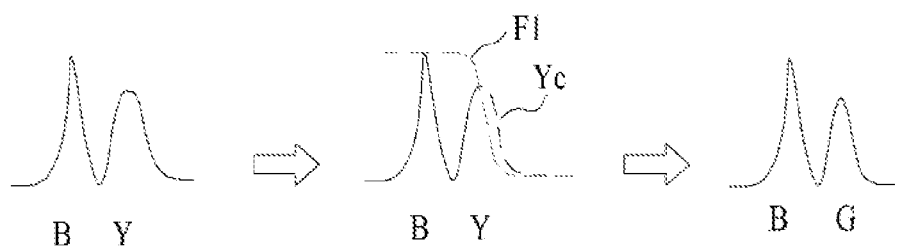
FIG. 8 is a schematic diagram showing the reflection pattern of a first dichroic filter layer.

In addition, FIG. 7 is a schematic diagram showing the reflection pattern of the second dichroic filter layer, and FIG. 8 is a schematic diagram showing the reflection pattern of the first dichroic filter layer.

Hereinafter, a process of emitting high-purity red, green, and blue light in the planar lighting device according to the first embodiment will be described with reference to FIGS. 5 to 8.

First, as described above, the light source 210 may emit blue light B and yellow light Y.

The blue light B may pass through the second dichroic filter layer 220. However, the second dichroic filter layer 220 has a reflection pattern that reflects at least a part of the long-wavelength portion in the wavelength band of the yellow light Y emitted from the yellow phosphor 112.

Accordingly, referring to FIG. 7, the long-wavelength portion Yc of the yellow light Y may be reflected, and only the green light G may be substantially transmitted.

In other words, when the blue light B and the yellow light Y emitted from the light source 210 pass through the second dichroic filter layer 220, the full width at half maximum of the green light G may be reduced. That is, the blue light B may pass through the second dichroic filter layer 220, and the full width at half maximum of the green light included in the yellow light Y may be reduced, so high-purity green light G may be emitted.

Referring to FIG. 7, the second dichroic filter layer 220 includes a transmission band and a reflection band. In this case, the reflection band may include at least a part Yc of the long-wavelength portion in the wavelength band of the yellow light Y emitted from the yellow phosphor 112.

In addition, the transmission band of the second dichroic filter layer 220 may be connected to the reflection band at the short-wavelength portion of the yellow light Y emitted from the yellow phosphor 112. That is, the transmission band of the second dichroic filter layer 220 may include the band of the blue light B.

Thereafter, the blue light B and the green light G pass through the red phosphor layer 230. In this process, at least a portion of the blue light B and the green light G may be converted into red light by the red phosphor layer 230.

Referring to FIG. 8, the red light R1 converted by the red phosphor layer 230 may have a relatively wide full width at half maximum. That is, the spectral peak of the red light may have a wide wavelength band. The red light R1 having such a wide peak wavelength band (full width at half maximum) may be disadvantageous from the aspect of color reproducibility for a liquid crystal display. Therefore, it may be advantageous from the aspect of color reproducibility to reduce the full width at half maximum of the light.

As mentioned above, the first dichroic filter layer 240, which has a reflection pattern that reflects at least a part Rc of the long-wavelength portion in the wavelength band of the red light emitted from the red phosphor layer 230, may be located on the red phosphor layer 230.

Referring to FIG. 8, the first dichroic filter layer 240 includes a transmission band and a reflection band. In this case, the reflection band may include at least a part Rc of the long-wavelength portion in the wavelength band of the red light R1 emitted from the red phosphor layer 230.

In addition, the transmission band of the first dichroic filter layer 240 may be connected to the reflection band at the short-wavelength portion of the red light emitted from the red phosphor layer 230. That is, the transmission band of the first dichroic filter layer 240 may include the band of the blue light B and the band of the green light G.

Accordingly, the boundary between the transmission band and the reflection band may be located within the peak of the red light R1.

When the red light R1 converted by the red phosphor layer 230 passes through the first dichroic filter layer 240, at least a part Rc of the long-wavelength portion in the wavelength band of the red light R1 may be reflected, and high-purity red light R may be emitted.

As a result, the first dichroic filter layer 240 may have an effect of reducing the full width at half maximum of the red light R1. That is, the initial red light R1 may have a wide full width at half maximum. However, the red light R may be imparted with a reduced full width at half maximum by passing through the first dichroic filter layer 240.

High-purity blue light B, green light G, and red light R may be emitted through the above process. That is, the blue light B, the green light G, and the red light R having a reduced full width at half maximum may be emitted.

In this way, the blue light B, the green light G, and the red light R having a reduced full width at half maximum may pass through a color filter in the liquid crystal panel, whereby a pixel emitting high-purity blue light B, green light G, and red light R may be realized. Accordingly, the color reproducibility of the liquid crystal display device may be improved.

Figure 9:
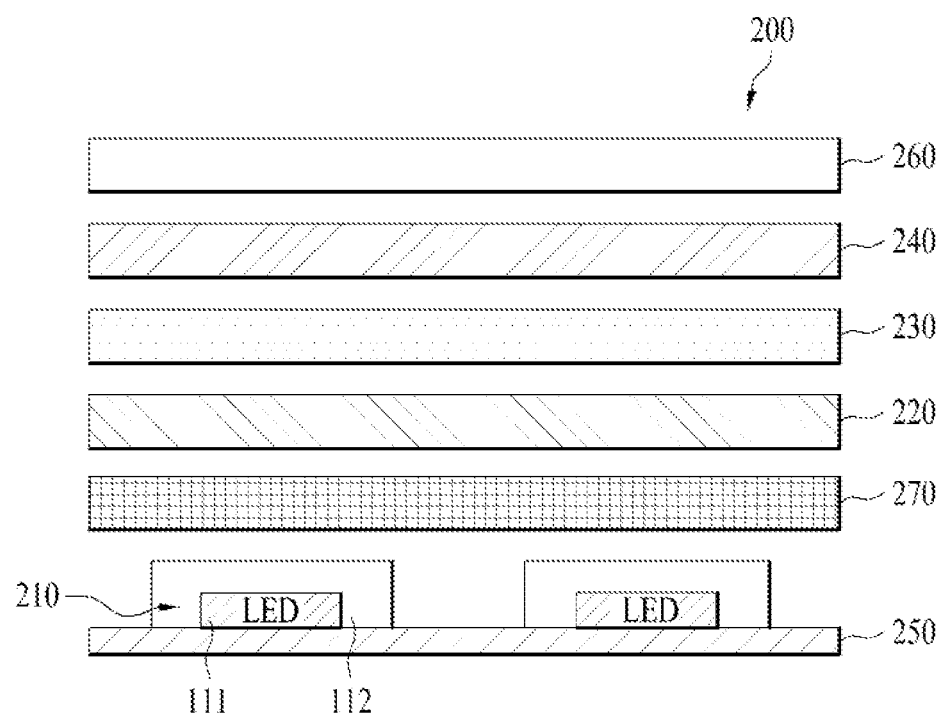
FIG. 9 is a schematic cross-sectional diagram showing a display device including a planar lighting device according to a second embodiment of the present disclosure.

FIG. 9 is a schematic cross-sectional diagram showing a display device including a planar lighting device according to a second embodiment of the present disclosure.

Referring to FIG. 9, a planar lighting device 200 includes a plurality of light sources 210 located on a reflective layer 250. Each of the light sources 210 may be implemented as a light-emitting element, such as a light-emitting diode (LED). The light-emitting element may emit white light. For example, the light-emitting element may be an element in which a yellow phosphor 112 is located on a blue light-emitting diode 111. The blue light emitted from the blue light-emitting diode 111 and the yellow light, resulting from conversion of at least a portion of the blue light by the yellow phosphor 112, may be mixed with each other to realize white light.

The planar lighting device 200 and the liquid crystal panel 60 may constitute a liquid crystal display device. An embodiment in which the liquid crystal panel 60 is omitted will be described below. However, the planar lighting device 200 of the present disclosure may implement a liquid crystal display device together with the liquid crystal panel 60. In addition, with regard to parts not described in this embodiment, reference may be made to the description of the parts described above with reference to FIGS. 1 to 3.

A red phosphor layer 230, which absorbs a portion of the white light emitted from the light sources 210 and emits red light, may be located on the light sources 210.

In addition, a first dichroic filter layer 240, which has a reflection pattern that reflects at least a part of the long-wavelength portion in the wavelength band of the red light emitted from the red phosphor layer 230, may be located on the red phosphor layer 230.

An optical sheet 260 may be located on the first dichroic filter layer 240.

Meanwhile, a second dichroic filter layer 220, which has a reflection pattern that reflects at least a part of the long-wavelength portion in the wavelength band of the yellow light emitted from the yellow phosphor 112, may be located between the light sources 210 and the red phosphor layer 230.

In addition, a green phosphor layer 270 may be located between the light sources 210 and the second dichroic filter layer 220. The difference from the first embodiment is that the green phosphor layer 270 is further provided. Hereinafter, the function of the green phosphor layer 270 will be mainly described.

First, as described above, the light sources 210 may emit blue light B and yellow light Y.

The blue light B and the yellow light Y pass through the green phosphor layer 270. In this process, at least a portion of the blue light B and the yellow light Y may be converted into green light by the green phosphor layer 270.

Thereafter, at least a portion of the blue light B, the green light G, and the yellow light Y may pass through the second dichroic filter layer 220.

However, the second dichroic filter layer 220 has a reflection pattern that reflects at least a part of the long-wavelength portion in the wavelength band of the yellow light Y emitted from the yellow phosphor 112. Accordingly, in this process, the full width at half maximum of the green light G may be reduced. That is, the blue light B may pass through the second dichroic filter layer 220, and the full width at half maximum of the green light included in the yellow light Y may be reduced, so high-purity green light G may be emitted. In this case, the long-wavelength portion of the yellow light Y may be reflected.

As described above, high-purity blue light B and green light G having a reduced full width at half maximum may be emitted by passing through the second dichroic filter layer 220.

Since the subsequent process is the same as that described in the first embodiment, a duplicate description thereof will be omitted.

Figure 10:
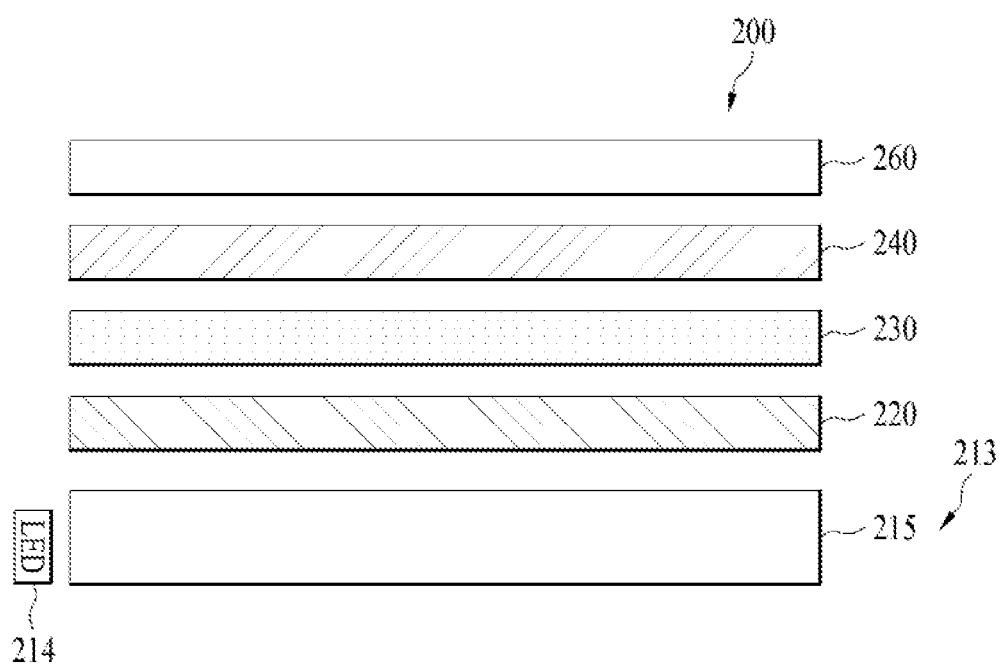
FIG. 10 is a schematic cross-sectional diagram showing a display device including a planar lighting device according to a third embodiment of the present disclosure.

FIG. 10 is a schematic cross-sectional diagram showing a display device including a planar lighting device according to a third embodiment of the present disclosure.

Referring to FIG. 10, a planar lighting device 200 may include a light source 213, which includes a light guide plate 215 and a light-emitting element 214 located beside the light guide plate 215. The light source 213 may be implemented using a blue light-emitting diode (LED) emitting blue light and a yellow phosphor.

The light source 213, which includes the light guide plate 215 and the light-emitting element 214, may be provided in a plural number, and the plurality of light sources may be arranged in the planar lighting device 200. Each of the light sources 213 may be implemented as a light-emitting element, such as a light-emitting diode (LED). Such a light-emitting element may emit white light.

As described above with reference to FIG. 1, the planar lighting device 200 may be located on the lower cover 20 (refer to FIG. 2), and the liquid crystal panel 60 (FIG. 1) may be located on the planar lighting device 200. The planar lighting device 200 and the liquid crystal panel 60 may constitute a liquid crystal display device. An embodiment in which the liquid crystal panel 60 is omitted will be described below. However, the planar lighting device 200 of the present disclosure may implement a liquid crystal display device together with the liquid crystal panel 60. In addition, with regard to parts not described in the following embodiment, reference may be made to the description of the parts described above with reference to FIGS. 1 to 3.

A red phosphor layer 230, which absorbs a portion of the white light emitted from the light source 213 and emits red light, may be located on the light source 213.

In addition, a first dichroic filter layer 240, which has a reflection pattern that reflects at least a part of the long-wavelength portion in the wavelength band of the red light emitted from the red phosphor layer 230, may be located on the red phosphor layer 230.

An optical sheet 260 may be located on the first dichroic filter layer 240.

Meanwhile, a second dichroic filter layer 220, which has a reflection pattern that reflects at least a part of the long-wavelength portion in the wavelength band of the yellow light emitted from the light source 213 together with the blue light, may be located between the light source 213 and the red phosphor layer 230.

The configuration of this embodiment may be the same as that of the first embodiment described above except for the light source 213, which includes the light guide plate 215 and the light-emitting element 214.

Figure 11:
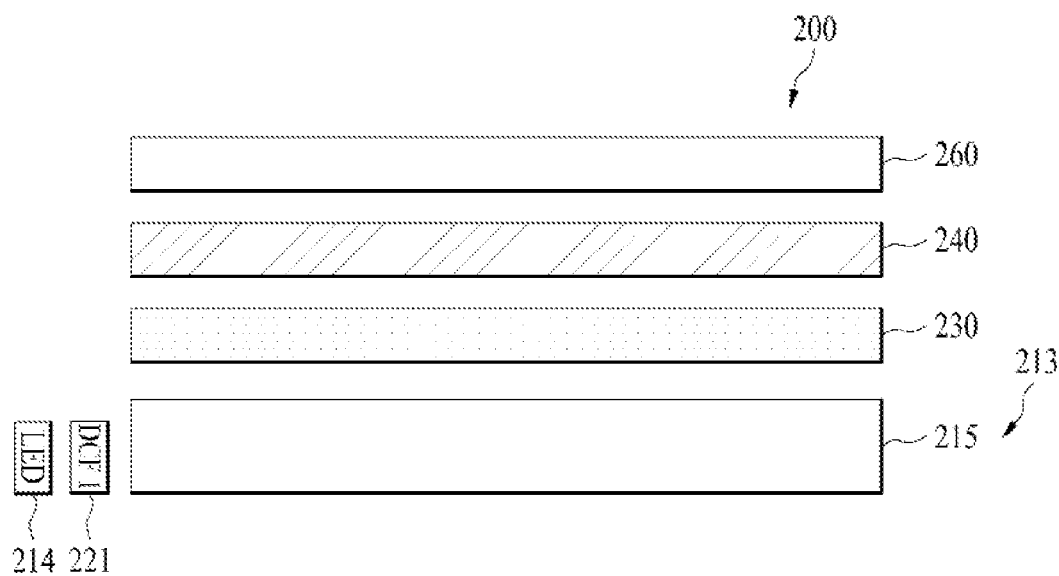
FIG. 11 is a schematic cross-sectional diagram showing a display device including a planar lighting device according to a fourth embodiment of the present disclosure.

FIG. 11 is a schematic cross-sectional diagram showing a display device including a planar lighting device according to a fourth embodiment of the present disclosure.

Referring to FIG. 11, a planar lighting device 200 may include a light source 213, which includes a light guide plate 215 and a light-emitting element 214 located beside the light guide plate 215. The light source 213 may be implemented using a blue light-emitting diode (LED) emitting blue light and a yellow phosphor.

The light source 213, which includes the light guide plate 215 and the light-emitting element 214, may be provided in a plural number, and the plurality of light sources may be arranged in the planar lighting device 200. Each of the light sources 213 may be implemented as a light-emitting element, such as a light-emitting diode (LED). Such a light-emitting element may emit white light.

The planar lighting device 200 and the liquid crystal panel 60 may constitute a liquid crystal display device. An embodiment in which the liquid crystal panel 60 is omitted will be described below. However, the planar lighting device 200 of the present disclosure may implement a liquid crystal display device together with the liquid crystal panel 60. In addition, with regard to parts not described in this embodiment, reference may be made to the description of the parts described above with reference to FIGS. 1 to 3.

The white light emitted from the light-emitting element 214 may uniformly spread through the light guide plate 215, and may then be incident on a red phosphor layer 230.

In this case, a second dichroic filter layer 221 may be located between the light-emitting element 214 and the light guide plate 215.

In addition, a first dichroic filter layer 240, which has a reflection pattern that reflects at least a part of the long-wavelength portion in the wavelength band of the red light emitted from the red phosphor layer 230, may be located on the red phosphor layer 230.

An optical sheet 260 may be located on the first dichroic filter layer 240.

Other parts not described herein may be the same as those of the second embodiment described above. Therefore, duplicate descriptions thereof will be omitted.

Figure 12:
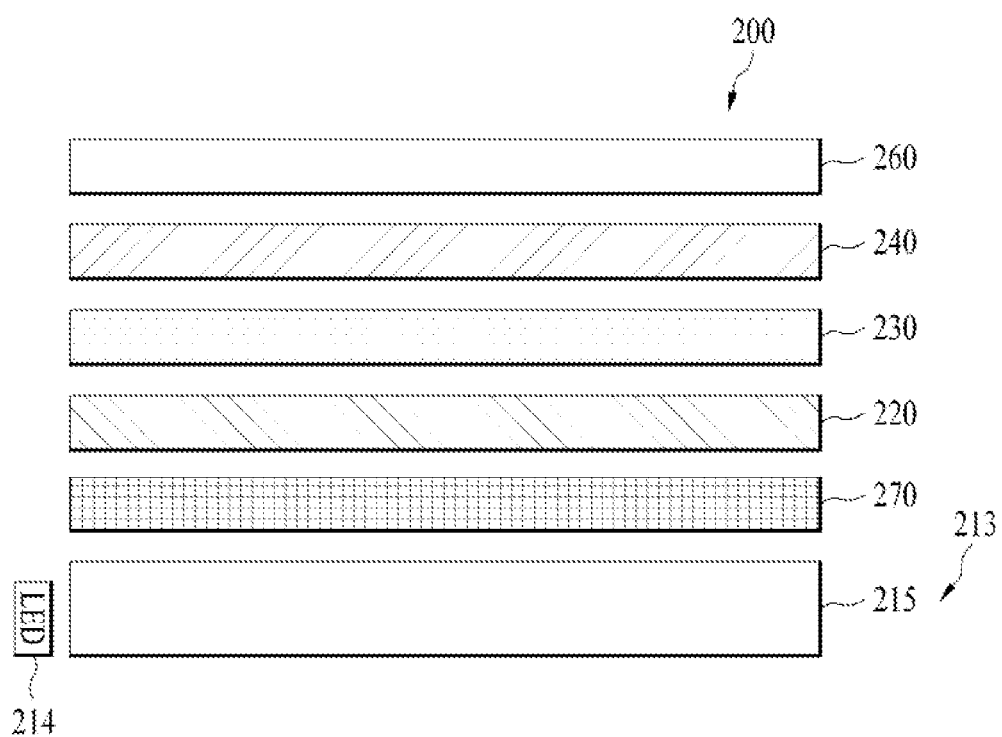
FIG. 12 is a schematic cross-sectional diagram showing a display device including a planar lighting device according to a fifth embodiment of the present disclosure.

FIG. 12 is a schematic cross-sectional diagram showing a display device including a planar lighting device according to a fifth embodiment of the present disclosure.

Referring to FIG. 12, a planar lighting device 200 may include a light source 213, which includes a light guide plate 215 and a light-emitting element 214 located beside the light guide plate 215. The light source 213 may be implemented using a blue light-emitting diode (LED) emitting blue light and a yellow phosphor.

The light source 213, which includes the light guide plate 215 and the light-emitting element 214, may be provided in a plural number, and the plurality of light sources may be arranged in the planar lighting device 200. Each of the light sources 213 may be implemented as a light-emitting element, such as a light-emitting diode (LED). Such a light-emitting element may emit white light.

The planar lighting device 200 and the liquid crystal panel 60 may constitute a liquid crystal display device. An embodiment in which the liquid crystal panel 60 is omitted will be described below. However, the planar lighting device 200 of the present disclosure may implement a liquid crystal display device together with the liquid crystal panel 60. In addition, with regard to parts not described in this embodiment, reference may be made to the description of the parts described above with reference to FIGS. 1 to 3.

The white light emitted from the light-emitting element 214 may uniformly spread through the light guide plate 215, and may then be incident on a green phosphor layer 270.

A second dichroic filter layer 220 may be located on the green phosphor layer 270, and a red phosphor layer 230, which absorbs a portion of the white light emitted from the light source 213 and emits red light, may be located on the second dichroic filter layer 220.

In addition, a first dichroic filter layer 240, which has a reflection pattern that reflects at least a part of the long-wavelength portion in the wavelength band of the red light emitted from the red phosphor layer 230, may be located on the red phosphor layer 230.

An optical sheet 260 may be located on the first dichroic filter layer 240.

The configuration of this embodiment may be the same as that of the second embodiment described above except for the light source 213, which includes the light guide plate 215 and the light-emitting element 214. Therefore, a duplicate description thereof will be omitted.

Figure 13:
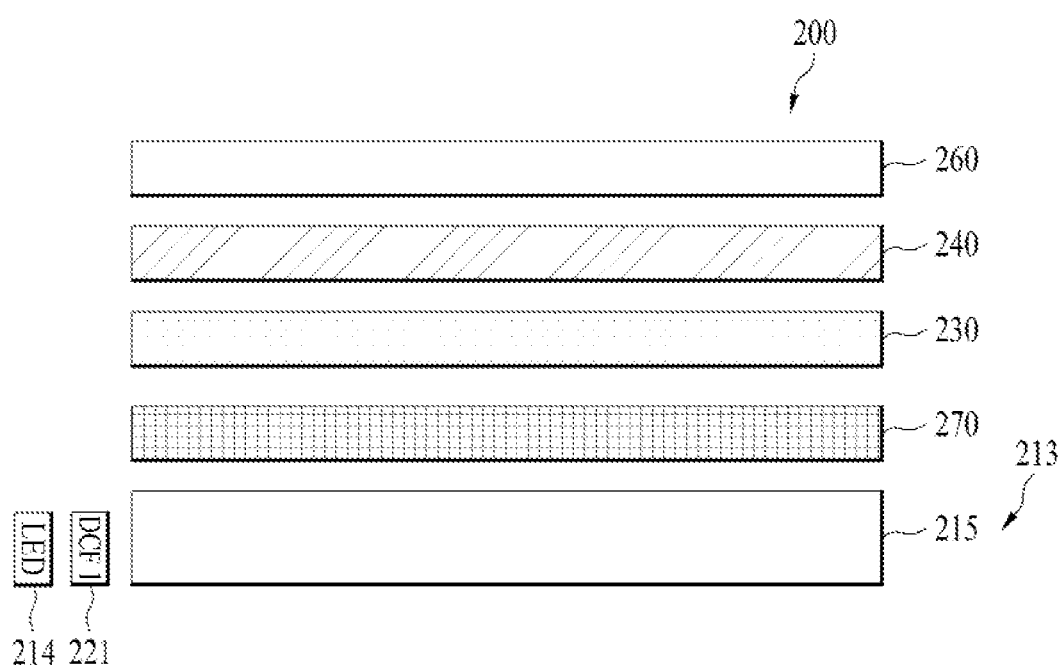
FIG. 13 is a schematic cross-sectional diagram showing a display device including a planar lighting device according to a sixth embodiment of the present disclosure.

FIG. 13 is a schematic cross-sectional diagram showing a display device including a planar lighting device according to a sixth embodiment of the present disclosure.

Referring to FIG. 13, a planar lighting device 200 may include a light source 213, which includes a light guide plate 215 and a light-emitting element 214 located beside the light guide plate 215. The light source 213 may be implemented using a blue light-emitting diode (LED) emitting blue light and a yellow phosphor.

The light source 213, which includes the light guide plate 215 and the light-emitting element 214, may be provided in a plural number, and the plurality of light sources may be arranged in the planar lighting device 200. Each of the light sources 213 may be implemented as a light-emitting element, such as a light-emitting diode (LED). Such a light-emitting element may emit white light.

The planar lighting device 200 and the liquid crystal panel 60 may constitute a liquid crystal display device. An embodiment in which the liquid crystal panel 60 is omitted will be described below. However, the planar lighting device 200 of the present disclosure may implement a liquid crystal display device together with the liquid crystal panel 60. In addition, with regard to parts not described in this embodiment, reference may be made to the description of the parts described above with reference to FIGS. 1 to 3.

The white light emitted from the light-emitting element 214 may uniformly spread through the light guide plate 215, and may then be incident on a green phosphor layer 270.

In this case, a second dichroic filter layer 221 may be located between the light-emitting element 214 and the light guide plate 215. In addition, a red phosphor layer 230 may be located on the green phosphor layer 270.

In addition, a first dichroic filter layer 240, which has a reflection pattern that reflects at least a part of the long-wavelength portion in the wavelength band of the red light emitted from the red phosphor layer 230, may be located on the red phosphor layer 230.

An optical sheet 260 may be located on the first dichroic filter layer 240.

Other parts not described herein may be the same as those obtained by combining the fourth embodiment and the fifth embodiment described above. Therefore, duplicate descriptions thereof will be omitted.

Figure 14:
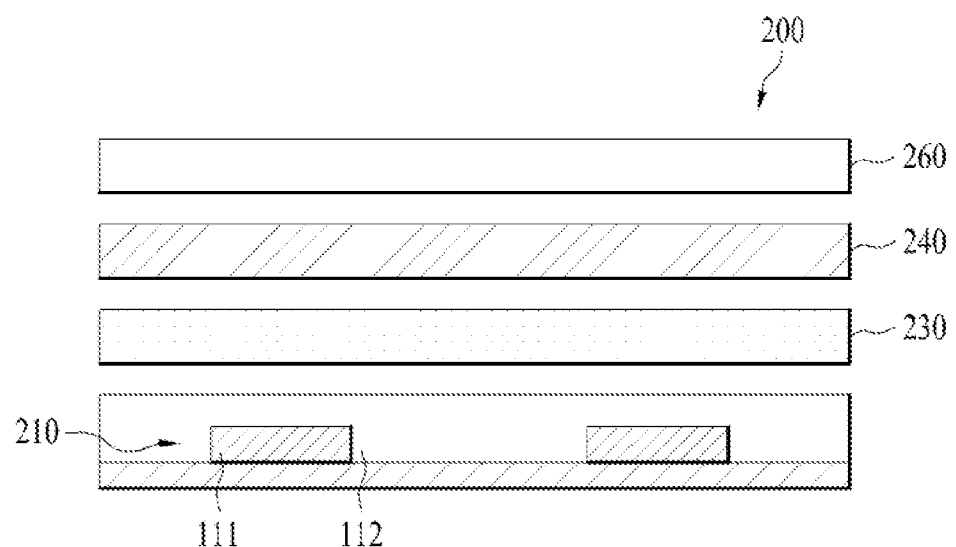
FIG. 14 is a schematic cross-sectional diagram showing a display device including a planar lighting device according to a seventh embodiment of the present disclosure.

FIG. 14 is a schematic cross-sectional diagram showing a display device including a planar lighting device according to a seventh embodiment of the present disclosure.

The second dichroic filter layer 220 of the first embodiment described with reference to FIG. 5 may be omitted. FIG. 14 illustrates an embodiment in which the second dichroic filter layer 220 is not provided, and a red phosphor layer 230 is located directly on a light source 210.

Referring to FIG. 14, a planar lighting device 200 includes a plurality of light sources 210, which are located on a reflective layer 250.

A red phosphor layer 230, which absorbs a portion of the white light emitted from the light sources 210 and emits red light, may be located on the light sources 210.

In addition, a first dichroic filter layer 240, which has a reflection pattern that reflects at least a part of the long-wavelength portion in the wavelength band of the red light emitted from the red phosphor layer 230, may be located on the red phosphor layer 230.

An optical sheet 260 may be located on the first dichroic filter layer 240.

With regard to parts not described herein, reference may be made to the description of the parts of the first embodiment described above with reference to FIG. 5.

Figure 15:
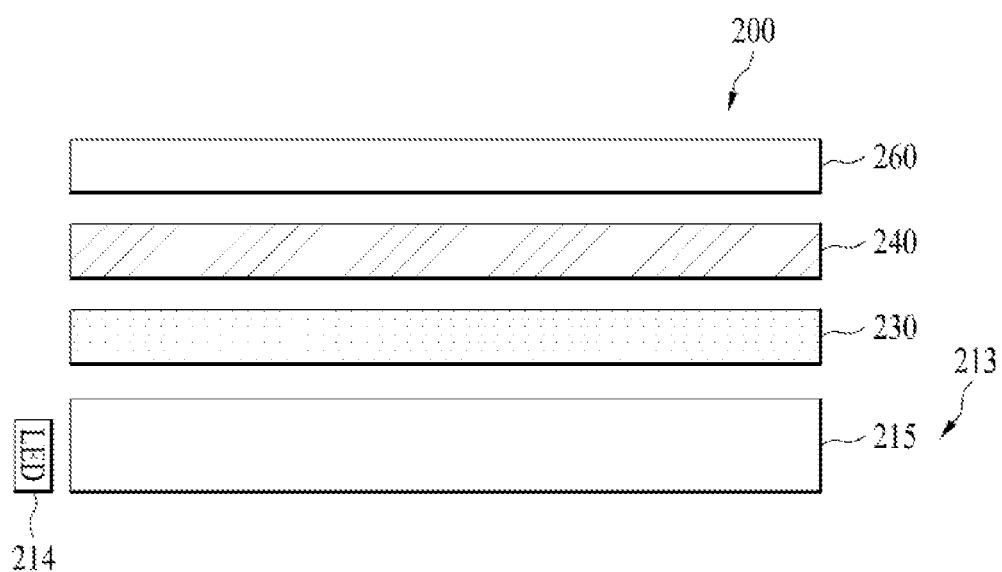
FIG. 15 is a schematic cross-sectional diagram showing a display device including a planar lighting device according to an eighth embodiment of the present disclosure.

FIG. 15 is a schematic cross-sectional diagram showing a display device including a planar lighting device according to an eighth embodiment of the present disclosure.

The second dichroic filter layer 220 of the first embodiment described with reference to FIG. 5 may be omitted. FIG. 15 illustrates an embodiment in which the second dichroic filter layer 220 is not provided, and a red phosphor layer 230 is located directly on a light source 213, which uses a light guide plate 215.

Referring to FIG. 15, a planar lighting device 200 may include a light source 213, which includes a light guide plate 215 and a light-emitting element 214 located beside the light guide plate 215.

A red phosphor layer 230, which absorbs a portion of the white light emitted from the light source 213 and emits red light, may be located on the light source 213.

In addition, a first dichroic filter layer 240, which has a reflection pattern that reflects at least a part of the long-wavelength portion in the wavelength band of the red light emitted from the red phosphor layer 230, may be located on the red phosphor layer 230.

An optical sheet 260 may be located on the first dichroic filter layer 240.

With regard to parts not described herein, reference may be made to the description of the parts of the first embodiment described above with reference to FIG. 5.

As described above, when blue light B and yellow light Y converted by the yellow phosphor are mixed with each other to form white light, the second dichroic filter layer 220 may transmit the short-wavelength portion of the yellow light Y, and may reflect at least a part of the long-wavelength portion of the yellow light Y.

Then, the long-wavelength portion of the yellow light Y may be reflected, and only the green light may be substantially transmitted. Accordingly, high-purity blue light and green light may be emitted.

As a result, the second dichroic filter layer 220 may have an effect of reducing the full width at half maximum of the yellow light Y or the green light G.

In addition, the first dichroic filter layer 240 may have an effect of reducing the full width at half maximum of the red light R1. That is, the initial red light R1 may have a wide full width at half maximum. However, the red light R may be imparted with a reduced full width at half maximum by passing through the first dichroic filter layer 240.

High-purity blue light B, green light G, and red light R may be emitted through the above process. That is, the blue light B, the green light G, and the red light R having a reduced full width at half maximum may be emitted.

In this way, the blue light B, the green light G, and the red light R having a reduced full width at half maximum may pass through a color filter in the liquid crystal panel, whereby a pixel emitting high-purity blue light B, green light G, and red light R may be realized. Accordingly, the color reproducibility of the liquid crystal display device may be improved.

As a result, according to the present disclosure, it is possible to realize high color reproducibility without using a quantum dot sheet.

The above description is merely illustrative of the technical idea of the present disclosure. Those of ordinary skill in the art to which the present disclosure pertains will be able to make various modifications and variations without departing from the essential characteristics of the present disclosure.

Therefore, embodiments disclosed in the present disclosure are not intended to limit the technical idea of the present disclosure, but to describe the same, and the scope of the technical idea of the present disclosure is not limited by such embodiments.

The scope of protection of the present disclosure should be interpreted by the claims below, and all technical ideas within the scope equivalent thereto should be construed as being included in the scope of the present disclosure.

INDUSTRIAL APPLICABILITY

The present disclosure may provide a display device including a planar lighting device using a light-emitting diode (LED).

What is claimed is:

1. A display device including a planar lighting device, the display device comprising:
    a light source configured to emit white light using a light-emitting element and a yellow phosphor;
    a red phosphor layer located on the light source, the red phosphor layer being configured to absorb a portion of the white light emitted from the light source and to emit red light; and
    a first dichroic filter layer located on the red phosphor layer, the first dichroic filter layer having a reflection pattern reflecting at least a part of a long-wavelength portion in a wavelength band of the red light.

2. The display device of claim 1, comprising a second dichroic filter layer located between the light source and the red phosphor layer, the second dichroic filter layer having a reflection pattern reflecting at least a part of a long-wavelength portion in a wavelength band of yellow light emitted from the yellow phosphor.

3. The display device of claim 2, wherein the light source comprises:
    a light guide plate,
    wherein the light-emitting element is located beside the light guide plate, and
    wherein the second dichroic filter layer is located between the light-emitting element and the light guide plate.

4. The display device of claim 2, wherein the light source comprises:
    a reflective layer, and
    wherein the light-emitting element is disposed on the reflective layer, and emits light toward the second dichroic filter layer.

5. The display device of claim 1, wherein the first dichroic filter layer reduces a full width at half maximum of the red light.

6. The display device of claim 2, wherein the second dichroic filter layer reduces a full width at half maximum of the yellow light.

7. The display device of claim 6, wherein the second dichroic filter layer converts the yellow light into green light.

8. The display device of claim 2, wherein the first dichroic filter layer forms a peak corresponding to red light, and the second dichroic filter layer forms a peak corresponding to green light.

9. A display device including a planar lighting device, the display device comprising:
- a light source configured to emit white light using a light-emitting element and a yellow phosphor;
- a red phosphor layer located on the light source, the red phosphor layer being configured to absorb a portion of the white light emitted from the light source and to emit red light; and
- a first dichroic filter layer located on the red phosphor layer, the first dichroic filter layer comprising a transmission band and a reflection band, the reflection band comprising at least a part of a long-wavelength portion in a wavelength band of the red light.

10. The display device of claim 9, wherein the transmission band is connected to the reflection band at a short-wavelength portion of the red light.

11. The display device of claim 9, wherein the transmission band and the reflection band form a boundary therebetween, and the boundary is located within a peak of the red light.

12. The display device of claim 9, comprising a second dichroic filter layer located between the light source and the red phosphor layer, the second dichroic filter layer having a reflection pattern reflecting at least a part of a long-wavelength portion in a wavelength band of yellow light emitted from the yellow phosphor.

13. The display device of claim 12, wherein the light source comprises:
- a light guide plate,
- wherein the light-emitting element is located beside the light guide plate, and
- wherein the second dichroic filter layer is located between the light-emitting element and the light guide plate.

14. The display device of claim 12, wherein the light source comprises:
- a reflective layer, and
- wherein the light-emitting element is disposed on the reflective layer, and emits light toward the second dichroic filter layer.

15. The display device of claim 12, wherein the first dichroic filter layer forms a peak corresponding to red light, and the second dichroic filter layer forms a peak corresponding to green light.

* * * * *